No. 878,319. PATENTED FEB. 4, 1908.
B. L. SINCLAIR & L. L. LESLIE.
HORSE RELEASER.
APPLICATION FILED SEPT. 30, 1907.
2 SHEETS—SHEET 1.
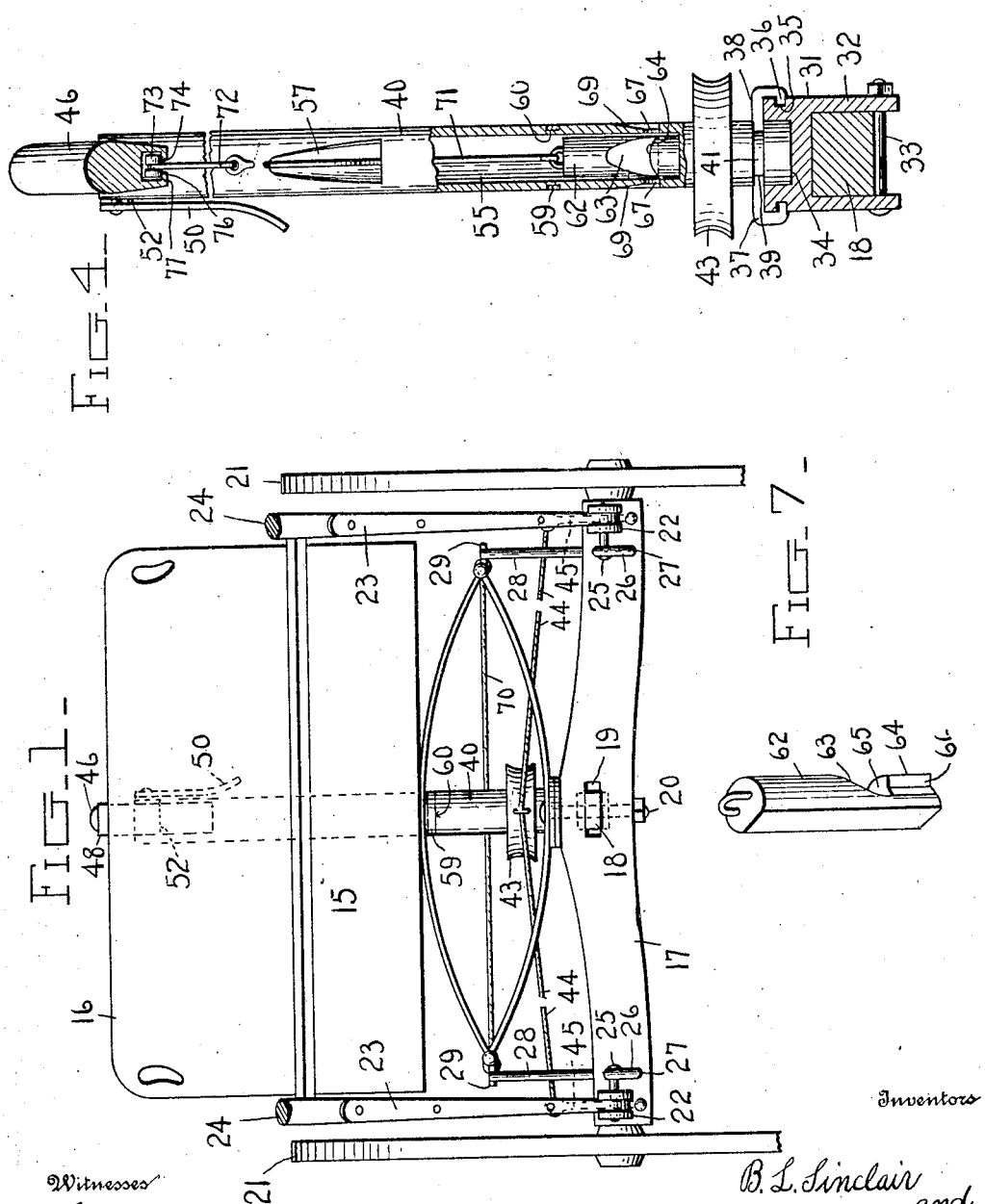

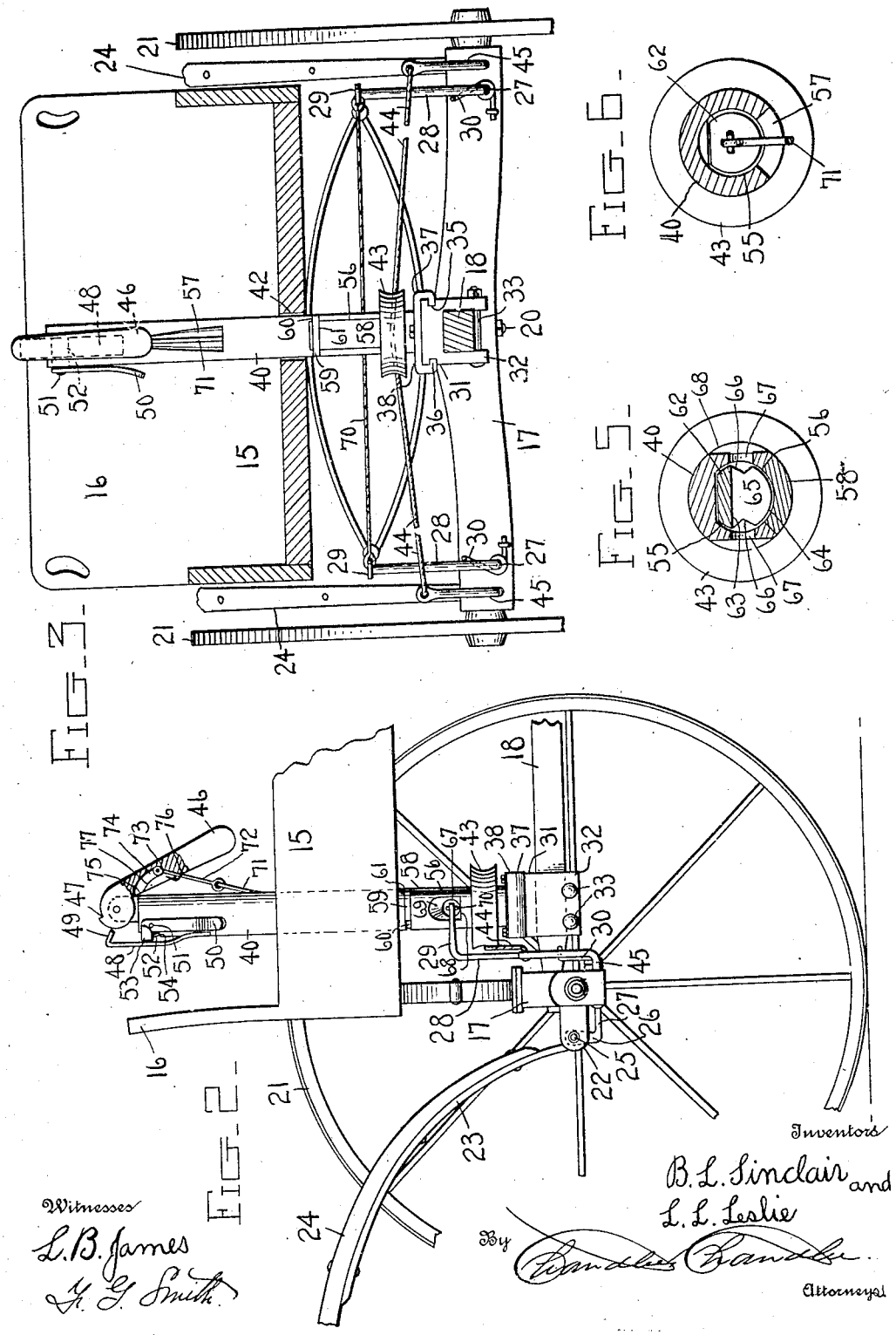

UNITED STATES PATENT OFFICE.

BERT L. SINCLAIR AND LISHA L. LESLIE, OF SANTA FE, TERRITORY OF NEW MEXICO.

HORSE-RELEASER.

No. 878,319.  Specification of Letters Patent.  Patented Feb. 4, 1908.

Application filed September 30, 1907. Serial No. 395,255.

*To all whom it may concern:*

Be it known that we, BERT L. SINCLAIR and LISHA L. LESLIE, citizens of the United States, residing at Santa Fe, in the county of Santa Fe, Territory of New Mexico, have invented certain new and useful Improvements in Horse-Releasers; and we do hereby declare the following to be a full, clear, and exact description of the invention, such as will enable others skilled in the art to which it appertains to make and use the same.

This invention relates to horse releasers and has for its object to provide, in conjunction with the releasing mechanism, a means whereby the vehicle from which the horse is released, may be steered or guided after such releasing of the horse until it comes to a standstill.

One of the salient disadvantages to be found in the present construction of horse releasers lies in the fact that no means is provided for guiding and steering the vehicle after releasing the horse and hence it is often times more dangerous to release the horse than to allow him to continue as the vehicle, not being guided is liable to leave the road and be damaged which will in all probability result in injury to the occupants.

While devices similar to this have heretofore been devised, the horse releasing means and the steering or guiding means are absolutely independent of each other in nearly every instance, but in my invention, but one hand lever is operated, to release the horse and subsequently to guide the vehicle.

In the accompanying drawings, Figure 1 is a front elevation of a buggy showing the application of my invention thereto, Fig. 2 is a side elevation thereof the near front wheel being removed, Fig. 3 is a vertical sectional view through the buggy taken directly in front of the seat and showing the releasing and guiding mechanism in rear elevation, Fig. 4 is a detail vertical sectional view through the entire shaft and its bearing, Fig. 5 is a horizontal sectional view through the shaft in a plane with the openings therethrough through which the releasing strap passes, Fig. 6 is a similar view taken in a plane above the openings, and, Fig. 7 is a detail perspective view of the lifting catch or hook for the said strap.

In the drawings, there is shown a buggy comprising the usual bed 15, dash-board 16, front axle 17 and reach 18. The front end of the reach 18 extends into a slot 19 formed horizontally in the axle 17 and the usual king bolt 20 is passed through the axle and the said front end of the reach whereby the axle may have a turning movement with respect to the reach. Fixed upon the axle adjacent each end thereof but inwardly of the front wheels which are indicated by the numeral 21 are the usual thill clips 22 to which are pivoted the thill irons 23 of the buggy shaft 24, this pivotal connection being had by means of pins 25. These pins 25 are loosely connected with the forward crank end 26 of a rocking member 27, these members being engaged for rocking movement through the axle one directly inwardly of each thill clip. The rear portions of these members are also cranked to form upstanding portions 28 and the extreme upper ends of the portions 28 are turned directly rearwardly at right angles as at 29 for a purpose to be presently described. In order that the rocking members may be held in such position that the pins will be retained in their seats, a spring 30 is secured at one of its ends to the rear face of the axle and is coiled around the axis of the rocking member and thence extended upwardly and bent to engage the portion 28 of the respective rocking member, these portions 28 being in this manner normally swung in the direction of the corresponding ends of the axle and the cranked portions 26 being swung in a corresponding direction to hold the pins seated as stated above.

The operating shaft, its bearings, and the various elements associated therewith will now be described. A step bearing 31 includes integral cheek pieces 32 which straddle the reach 18 and through which bolts 33 are passed and beneath the reach so as to hold the bearing thereon. The bearings are provided with the usual socket 34 and secured to the reach in such a manner that it will be positioned in a plane directly rearwardly of the dash-board 16 of the vehicle. In opposite sides, the step bearing is provided with grooves or rabbets 35 in which are received tongues 36 formed integral with the inner faces of cheek pieces 37 which comprise a portion of a cap member 38, this cap member, exclusive of the cheek pieces being in the form of a flat plate having a central opening 39. This cap plate 38 is of course bolted to the step bearing 31 and is formed in sections so that it may be engaged with the shaft prior to being secured to the step bearing as will be presently made apparent.

The operating shaft is indicated by the numeral 40 and adjacent its lower end is provided with an annular groove 41 in which the edges of the opening 39 in the cap plate 38 engage, that portion of the shaft below the groove 41 being received in the socket 34 of the step bearing 31. It will be understood that by this construction the shaft may have a turning movement in a vertical plane but cannot have a vertical movement to unseat from its bearing. The shaft is extended upwardly through an opening 42 in the bed 15 of the vehicle at a point directly rearwardly of the dash-board and at the middle thereof.

In order that the axle may be manually turned to guide the vehicle after releasing the horse, I have provided upon the shaft 40 at a point directly above its bearing, a grooved pulley 43 to which is secured at its middle a cord or strap 44 the ends of which are connected to upstanding bracket arms 45 fixed to the axle adjacent each end thereof. At the upper end of the shaft 40 there is pivoted a hand lever 46 which normally hangs downwardly in a rearwardly inclined plane. This lever is shouldered as at 47 at its forward or pivoted end and a spring leaf latch 48 is secured to the front side of the shaft 40 at the upper end thereof and has its upper end portion bent at an acute angle as at 49 so that when the hand lever 46 is swung from its normal position to a horizontal position this bent end 49 will ride over the pivoted end of the lever and engage above the shoulder 47 formed thereon and in this manner hold the lever in horizontal raised position. When in this position the lever may be grasped as will be readily understood and swung to the right or to the left so as to correspondingly swing the axle of the vehicle. In order that the hand lever 46 may be released from this position, I have provided a lever 50 which is pivoted as at 51 to the shaft 40 at the upper end thereof. This lever includes a portion 52 which is bent to extend horizontally and laterally at right angles with respect to the lever 50 and across the front face of the shaft 40 at the upper end thereof and slightly above the plane of the pivot 51. The upper edge of this portion 52 is preferably overturned as indicated at 53 so as to ride over the rear or inner face of the leaf spring latch 48 and the lower edge of the said portion 52 is curved inwardly and works in a slot 54 cut in the said front face of the shaft 40 at its upper end. The latch 48 being in engagement with the hand lever 46 to hold the same raised, and it being desired to release the hand lever, the lever 50 is grasped and swung rearwardly so that the overturned upper edge of the portion 52 will ride over the inner face of the said latch 48 and will spring the latch out of such engagement thus permitting the lever 46 to drop to its normal position.

A bore 55 is formed vertically through the shaft 40 and opens, above the grooved pulley 43, through the rear side of the shaft as indicated at 56 and also through the rear side at a point adjacent the upper end of the shaft as at 57 although at this latter point the bore is gradually merged in the rear face of the shaft, so to speak. A cap segment 58 is fitted against the shaft to close the opening 56 therethrough and this plate has its lower end engaged or seated between the shaft and the pulley and is held in this position by means of a split ring 59 which is movable axially in an annular groove 60 formed in the shaft above the pulley and is also movable in a groove 61 formed in the convex side of the cap plate 58. As stated this plate normally closes the opening 56 but should it become necessary to repair certain elements which are movable within this bore as will be presently described the plate may be displaced to permit of access to the said elements.

Slidable within the bore 55 of the shaft 40 is a pin 62 which adjacent its lower end is beveled as at 63 to form a shoulder 64 which shoulder is located at the extreme lower end of the pin and is slotted in its upper face as at 65, the pin being provided in opposite sides with grooves 66 which coincide with the slot 65 formed in the upper face of the head 64 for a purpose to be presently explained. When this pin 62 is at the lower limit of its movement, the recess formed between the beveled face 63 and the upper face of the head 64 is in alinement with openings 67 formed in opposite sides of the shaft 40 and opening into the bore of the same. The lower edges of these openings 67 are straight and plane as indicated at 68 but that portion of the shaft which surrounds the upper edges is beveled as at 69. A cable or strap 70 is connected at its ends to the upper right angularly and rearwardly turned ends of the portions 28 of the rocking members upon the axle and this cable or strap passes loosely through the openings 67 and the recess formed between the beveled face 63 of the pin and the upper face of the head 64 thereof or in other words through the slot 65. This passage of the cable or strap through the openings and the slot is a loose one and as a consequence the axle 17 may turn independently of the operating shaft 40 without a pull being exerted upon the cable or strap to operate the releasing devices. A rod 71 is pivoted at its lower end to the upper end of the pin 62 and at its upper end this rod has pivoted to it the lower end of a link 72. This link 72 carries at its upper end a rotatable roller 73 and this roller, and the upper end of the link is normally inserted in an inclined slot 74 formed in the under side of the operating lever 46. This slot as stated is inclined and opens at its lower forward end as at 75 through the said handle, the slot rearwardly of its end 75 being contracted as at 76 so as to form inclined ledges or trackways 77 over which the roller at the upper end of the link 72 may travel.

Under normal conditions the roller is as stated, engaged in the slot and the hand lever 46 depends. At such time the pin 62 is also at the lower limit of its movement. Now when it is desired to release the horse from the vehicle, the operating lever is moved upwardly drawing the pin 62 in a corresponding direction and exerting a pull upon the cable or strap 70 to oscillate the rocking members 27 and withdraw the pins 25 from their seats in the thill clips and irons thus releasing the thills. As the hand lever is swung vertically toward a horizontal plane the roller will travel downwardly in the slot in the said lever and when such a horizontal plane has been reached the roller will disengage from the slot and the pin 62 will then drop to its original position. The lever 46 is at this time held in raised position by means of the latch 48 and the operating shaft may be turned through the instrumentality of this lever to guide the vehicle until it has come to a standstill.

What is claimed, is—

1. In a device of the class described, the combination with a vehicle bed, the front axle thereof, the thill clips carried by the axle, and the thills, of rockers mounted upon the axle, pins carried by the rockers and projecting through the thill clips and the thills, springs for normally holding the rockers in position to maintain the pins in the engagement stated, an operating shaft journaled vertically through the bed of the vehicle, the shaft being provided with a bore and with openings in opposite sides which open into the bore, a pin slidable vertically in the bore and being cut-away to register, when at the lower limit of its movement, with the said opening, a strap connected at its ends to cranked portions of the rockers and passed through the openings in the shaft and the cut-away portion of the pin, a hand lever pivoted at the upper end of the shaft for vertical swinging movement, and connection between the pin and the lever whereby when the lever is swung vertically the pin will be moved upwardly to exert a pull upon the strap.

2. In a device of the class described, the combination with a vehicle bed, the front axle thereof, the thill clips carried by the axle, and the thills, of rockers mounted upon the axle, pins carried by the rockers and projecting through the thill clips and the thills, springs for normally holding the rockers in position to maintain the pins in the engagement stated, an operating shaft journaled vertically through the bed of the vehicle, the shaft being provided with a bore and with openings in opposite sides which open into the bore, a pin slidable vertically in the bore and being cut-away to register, when at the lower limit of its movement, with the said opening, a strap connected at its ends to cranked portions of the rockers and passed through the openings in the shaft and the cut-away portion of the pin, a hand lever pivoted at the upper end of the shaft for vertical swinging movement, connection between the pin and the lever whereby when the lever is swung vertically the pin will be moved upwardly to exert a pull upon the strap, and flexible connection between the shaft and each end of the axle whereby the shaft may be rotated through the instrumentality of the hand lever to swing the axle.

3. In a device of the class described, the combination with a vehicle bed, the front axle thereof, the thill clips carried by the axle, and the thills, of rockers mounted upon the axle, pins carried by the rockers and projecting through the thill clips and the thills, springs for normally holding the rockers in position to maintain the pins in the engagement stated, an operating shaft journaled vertically through the bed of the vehicle, the shaft being provided with a bore and with openings in opposite sides which open into the bore, a pin slidable vertically in the bore and being cut-away to register, when at the lower limit of its movement, with the said opening, a strap connected at its ends to cranked portions of the rockers and passed through the openings in the shaft and the cut-away portion of the pin, a hand lever pivoted at the upper end of the shaft for vertical swinging movement, connection between the pin and the lever whereby when the lever is swung vertically the pin will be moved upwardly to exert a pull upon the strap, flexible connection between the shaft and each end of the axle whereby the shaft may be rotated through the instrumentality of the hand lever to swing the axle, and a latch for holding the hand lever in raised position when so swung.

4. In a device of the class described, the combination with a vehicle bed, the front axle thereof, the thill clips carried by the axle, and the thills, of rockers mounted upon the axle, pins carried by the rockers and projecting through the thill clips and the thills, springs for normally holding the rockers in position to maintain the pins in the engagement stated, an operating shaft journaled vertically through the bed of the vehicle, the shaft being provided with a bore and with openings in opposite sides which open into the bore, a pin slidable vertically in the bore and being cut-away to register, when at the lower limit of its movement, with the said opening, a strap connected at its ends to cranked portions of the rockers and passed through the openings in the shaft and the cut-away portion of the pin, a hand lever pivoted at the upper end of the shaft for vertical swinging movement, connection between the pin and the lever whereby when the lever is swung vertically the pin will be moved upwardly to exert a pull upon the strap, flexible connection between the shaft and each end of the axle whereby the shaft may be rotated through the instrumentality of the hand lever to swing the axle, and a spring latch for holding the hand lever in raised position when so swung.

5. In a device of the class described, the combination with a vehicle bed, the front axle thereof, the thill clips carried by the axle, and the thills, of rockers mounted upon the axle, pins carried by the rockers and projecting through the thill clips and the thills, springs for normally holding the rockers in position to maintain the pins in the engagement stated, an operating shaft journaled vertically through the bed of the vehicle, the shaft being provided with a bore and with openings in opposite sides which open into the bore, a pin slidable vertically in the bore and being cut-away to register, when at the lower limit of its movement, with the said opening, a strap connected at its ends to cranked portions of the rockers and passed through the openings in the shaft and the cut-away portion of the pin, a hand lever pivoted at the upper end of the shaft for vertical swinging movement, connection between the pin and the lever whereby when the lever is swung vertically the pin will be moved upwardly to exert a pull upon the strap, flexible connection between the shaft and each end of the axle whereby the shaft may be rotated through the instrumentality of the hand lever to swing the axle, a spring latch for holding the hand lever in raised position when so swung, and a manually operable means for disengaging the latch from the lever to permit dropping of the same to normal position.

6. In a device of the class described, the combination with a vehicle bed, the front axle thereof, the thill clips carried by the axle, and the thills, of rockers mounted upon the axle, pins carried by the rockers and projecting through the thill clips and the thills, springs for normally holding the rockers in position to maintain the pins in the engagement stated, an operating shaft journaled vertically through the bed of the vehicle, the shaft being provided with a bore and with openings in opposite sides which open into the bore, a pin slidable vertically in the bore and being cut-away to register when at the lower limit of its movement, with the said opening, a strap connected at its ends to cranked portions of the rockers and passed through the openings in the shaft and the cut-away portion of the pin, a hand lever pivoted at the upper end of the shaft for vertical swinging movement, the lever being provided in its under side with a slot which is inclined and opens at its lower forward end through the under side of the lever and is contracted rearwardly of its said open end, a rod pivoted to the upper end of the pin and extending through the bore of the shaft and through the rear side of the shaft, a link pivoted at its lower end to the upper end of the shaft, and a roller journaled at the upper end of the link and normally engaged in the slot.

In testimony whereof, we affix our signatures in presence of two witnesses.

BERT L. SINCLAIR.
LISHA L. LESLIE.

Witnesses:
C. E. NEWCOMER,
J. S. BLACKWELL.